United States Patent
Henry et al.

(10) Patent No.: US 6,248,285 B1
(45) Date of Patent: Jun. 19, 2001

(54) PREPARATION OF ORGANIC PIECES OF OPTICAL QUALITY AND ESPECIALLY ORGANIC LENSES

(75) Inventors: David Henry, Morigny-Champigny; Andre Vachet, La Genevraye, both of (FR)

(73) Assignee: Corning S.A., Avon Cedex (FR)

( * ) Notice: Subject to any disclaimer, the term of this patent is extended or adjusted under 35 U.S.C. 154(b) by 0 days.

(21) Appl. No.: 09/408,163

(22) Filed: Sep. 29, 1999

(30) Foreign Application Priority Data

Sep. 29, 1998 (FR) .................................................. 98 12139

(51) Int. Cl.⁷ ............................. C08F 226/06; C08F 2/46; G02C 7/02; G02C 7/10; B29D 11/00
(52) U.S. Cl. .......................... 264/496; 359/241; 359/242; 359/244; 351/159; 351/160 R; 351/162; 522/167; 522/64; 522/13; 522/75; 522/181; 523/106; 523/108
(58) Field of Search ..................................... 264/496, 494; 522/167, 169, 173, 174, 181, 182, 179, 75, 64, 13, 18; 359/241, 242, 244, 159, 160 R, 162; 523/108, 106

(56) References Cited

U.S. PATENT DOCUMENTS

| | | |
|---|---|---|
| 4,288,527 | 9/1981 | Morgan ................... 430/288 |
| 4,620,954 | 11/1986 | Singer et al. .......................... 264/1.4 |
| 5,373,033 * | 12/1994 | Toh et al. . |
| 5,405,567 * | 4/1995 | Kingsbury . |
| 5,442,022 * | 8/1995 | Keita et al. . |
| 5,531,940 * | 7/1996 | Gupta et al. . |
| 5,621,017 | 4/1997 | Kobayakawa et al. . |
| 5,882,556 * | 3/1999 | Perrott et al. . |
| 5,906,788 * | 5/1999 | Boeckler . |
| 5,908,876 * | 6/1999 | Fuji et al. . |
| 5,910,516 * | 6/1999 | Imura et al. ........................... 522/39 |
| 5,976,422 * | 11/1999 | Okoroafor et al. . |
| 6,034,193 * | 3/2000 | Henry et al. . |

FOREIGN PATENT DOCUMENTS

| | | |
|---|---|---|
| 0 562 861A1 | 9/1993 | (EP) . |
| 2754534 | 4/1998 | (FR) . |
| 2762845 | 11/1998 | (FR) . |
| 62-116615 | 5/1987 | (JP) . |
| WO 96/18921 * | 6/1996 | (WO) . |
| 97/21122 | 6/1997 | (WO) .............................. G02B/5/23 |
| 98/20373 | 5/1998 | (WO) . |
| 98/50443 | 11/1998 | (WO) . |

* cited by examiner

Primary Examiner—Susan W. Berman
(74) Attorney, Agent, or Firm—Angela N. Nwaneri; Peter Rogalskyj

(57) ABSTRACT

The main aim of the present invention is a method of preparing photochromic or non-photochromic organic pieces of optical quality and especially organic lenses, by radical polymerisation of a mixture of radically polymerisable monomers, characterised in that it comprises:

a) adjusting, by pre-polymerisation, the viscosity of said mixture, to a value between 0.4 and 2 Pa.s;

b) pouring said pre-polymerised mixture into a mould;

c) photogelifying, in said mould, said pre-polymerised mixture until its gel point;

d) completing the polymerisation of said pre-polymerised and gelified mixture in said mould, by heat treatment; adding effective amounts of at least one thermal catalyst and of at least one photoinitiator intervening in said mixture of monomers for the implementation of said pre-polymerisation, photogelification and polymerisation; said photoinitiator(s) intervening in an amount less than or equal to 0.009 parts by weight per 100 parts by weight of said mixture of monomers.

26 Claims, No Drawings

PREPARATION OF ORGANIC PIECES OF OPTICAL QUALITY AND ESPECIALLY ORGANIC LENSES

The present invention relates to the preparation of organic pieces of optical quality and especially to the preparation of organic lenses. More specifically, the main aim of the present invention is an original method of preparing such photochromic or non-photochromic organic pieces by radical polymerisation of a mixture of radically polymerisable monomers.

The aim of the present invention is also:
  novel organic pieces of this type, which are preparable by a variant of said method; this variant makes use of particular monomers;
  novel radically polymerisable compositions—mixtures of radically polymerisable monomers—which can be used for preparing organic pieces of this type according to the method of the invention.

The present invention is described below with particular reference to the context of the preparation of organic lenses (sight correction glasses, protective glasses). The present invention is in no way limited to said context and the person skilled in the art will easily understand that the claimed method is suitable for obtaining any type of moulded organic pieces, which is without optical defect, such as, therefore, organic lenses, but also windows, optical pieces . . . .

Purely thermal methods of radical polymerisation of mixtures of monomers (mainly acrylic and/or methacrylic and/or alkenyl monomers, especially vinylic monomers) which contain or do not contain an effective amount of at least one photochromic colorant, have been described and carried out, especially by the Applicant, for preparing photochromic or non-photochromic organic lenses, mainly optical or ophthalmic lenses. Said methods are carried out, in a lens mould, on a mixture containing an effective amount of at least one adequate thermal catalyst or radical polymerisation initiator. Said catalyst, when at least one photochromic colorant intervenes, is generally selected from diazo compounds (catalysts known as "soft" which remain "inert" towards the photochromic colorant(s) present). Such methods do not give entire satisfaction insofar as their implementation is long and insofar as, inescapably, during said implementation, oxygen diffuses into within the mixture undergoing polymerisation, this oxygen coming from the surrounding air and entering into the mould via its leaktight joint. This generates defects in the appearance and constraints (optical defects) in the lenses thus produced.

An alternative process for preparing such organic lenses was described in the U.S. patent U.S. Pat. No. 5,621,017. This alternative method is based on photopolymerisation under ultraviolet irradiation of the mixture of monomers containing an effective amount (0.01 to 1 parts by weight, per 100 parts by weight of monomers) of at least one appropriate photoinitiator. Such a method neither gives entire satisfaction insofar as, especially:

it may reveal to be delicate, even impossible to find satisfactory operating conditions (nature of the photoinitiator/irradiation band) in the light of the nature of the monomers present, in the light of the presence of at least one photochromic colorant (which reveals to be a competitor of absorption for the photoinitiator), and in the light of the specifications established for the final lens . . . .

its field of application is limited. It may in fact be suitable for preparing lenses of relatively low thickness (finished lenses of 2 mm thickness (see the Examples U.S. Pat. No. 5,621,017)) but it is not suitable for preparing thicker lenses (for example, semi-finished lenses of greater than 10 mm thickness). In fact, the problem of penetration of the ultraviolet radiation in the material to be polymerised is then come up against. In order to overcome this difficulty, it has been possible to envisage using a photoinitiator which absorbs in the visible. However, in order to guarantee obtaining a suitable result—a complete polymerisation which is homogeneous throughout the whole thickness—, it remains necessary to use a high concentration of photoinitiator and to use a lot of energy. Under such conditions—severe polymerisation conditions—lenses are generally obtained which possess a high degree of yellowing. In any case, in using a low concentration of photoinitiator (which is not susceptible to generate yellowing), it is very difficult to obtain a complete polymerisation throughout the whole of the mass of the material.

In such a context, the Applicant has developed a novel method of preparing organic pieces which enables obtaining said pieces, which are free from optical defects, up to relatively consequent thicknesses and this from various types of mixtures of monomers (even from mixtures which are known to be relatively difficult to polymerise). Said novel method can be qualified as a mixed method insofar as it includes thermal polymerisation and photochemical polymerisation.

Said original method of preparing organic pieces, and especially organic lenses, is described below. Characteristically, it includes a photogelification and it makes use of a low quantity of photoinitiator(s). Said method of the invention in fact comprises, for preparing photochromic or non-photochromic organic pieces by polymerisation of a mixture of radically polymerisable monomers (said mixture containing, classically in fact, the constituents of the piece or lens under preparation: main and secondary constituents of its matrix, of the monomer type, more generally conventional additives, especially such as the thermal catalyst, the photochromic colorant . . . ), the successive steps below:

a) adjusting, by pre-polymerisation, the viscosity of said mixture, to a value between 0.4 and 2 Pa.s;
  b) pouring said pre-polymerised mixture into a mould (especially a lens mould for preparing a lens);
  c) photogelifying, in said mould, said pre-polymerised mixture until its gel point;
  d) completing the polymerisation of said pre-polymerised and gelified mixture in said mould, by heat treatment;

the steps referred to as pre-polymerisation (a), photogelification (c) and polymerisation (d) being implemented out by the intervention, into said mixture of monomers, of effective amounts of at least one thermal catalyst and of at least one photoinitiator; said photoinitiator(s) intervening in an amount less than or equal to 0.009 parts by weight per 100 parts by weight of said mixture of monomers.

According to the method of the invention, the mixture containing the constituent elements of the piece under preparation is firstly pre-polymerised before it is poured into the mould. The implementation of such a pre-polymerisation out of the mould is very advantageous insofar as:

it enables neutralising the inhibitors present in said mixture (such polymerisation inhibitors are inescapably present in commercial products);

it enables increasing and adjusting the viscosity of the mixture to be poured afterwards in the mould. In said mould, the polymerisation thus implemented on a pre-polymerised and therefore viscous mixture is done so under the best circumstances since, within such a viscous mixture, the oxygen diffuses more slowly, the performances of the intervening photoinitiator are improved, the retraction is reduced, and the gel point is attained faster;

it can be carried out in a perfectly leaktight recipient, i.e. in the absence of oxygen and, therefore, without a constraint as to its duration.

It is highly recommended to implement said pre-polymerisation in order to bring the viscosity of the mixture to a value between 0.4 and 2 Pa.s. Below 0.4, the beneficial effects of said pre-polymerisation hardly manifest themselves (especially in the light of the problem of the diffusion of oxygen); above 2, problems of manipulation of the pre-polymerised mixture are come up against, and the gel point is come too close to.

The pre-polymerisation according to the invention is generally a thermal or photochemical pre-polymerisation which, for its implementation, necessitates the presence, in the mixture to be pre-polymerised, of an effective amount of at least one thermal catalyst and at least one photoinitiator, respectively.

At least one thermal catalyst (generally one thermal catalyst) must therefore intervene, in the mixture of monomers, right from the beginning of the method for the implementation of a thermal pre-polymerisation. It is generally added in an effective amount q, such that it ensures both the implementation of said thermal pre-polymerisation (step a), and then the subsequent step, of the final thermal polymerisation (step d). However, it is in no way excluded from the context of the invention to intervene them in two lots, in a first amount $q_1$, which is an effective amount for the implementation of the thermal pre-polymerisation, upstream from said pre-polymerisation and then, a second amount $q_2$ ($q_1+q_2=q$), which is an effective amount for the implementation of the final thermal polymerisation, downstream from said thermal pre-polymerisation, advantageously just after the thermal pre-polymerisation, before pouring the pre-polymerised mixture into the mould. In the hypothesis of the implementation of such a thermal pre-polymerisation, the amount of photoinitiator(s) necessary for the further implementation of the photogelification may also, advantageously, be made to intervene into the mixture to be pre-polymerised. Said amount may however intervene further on, upon completion of the thermal pre-polymerisation, before pouring the pre-polymerised mixture into the mould.

Thus, advantageously, the pre-polymerisation is a thermal pre-polymerisation carried out on the mixture of monomers containing the effective amounts of thermal catalyst(s) and photoinitiator(s) or containing only the effective amount of thermal catalyst(s), the effective amount of photoinitiator(s) being then added to said mixture of monomers upon completion of its thermal pre-polymerisation before it is poured into the mould.

At least one photoinitiator (generally one photoinitiator) must then intervene, into the mixture of monomers, right from the beginning of the method, for the implementation of a photochemical pre-polymerisation. Said photoinitiator may intervene right from the beginning in an effective amount Q such that it ensures both the implementation of said photochemical pre-polymerisation (step a) and then that of the subsequent photogelification step (step c). Advantageously, the photoinitiator may intervene in two lots, in a first amount $Q_1$, which is an effective amount for the implementation of the photochemical pre-polymerisation, upstream from said pre-polymerisation and then in a second amount $Q_2$ ($Q_1+Q_2=Q$), which is an effective amount for the implementation of the photogelification, downstream from said photochemical pre-polymerisation, advantageously just after the photochemical pre-polymerisation, before pouring the pre-polymerised mixture into mould. In the hypothesis of the implementation of such a photochemical pre-polymerisation, the thermal catalyst(s) subsequently useful in the final thermal polymerisation (step d) may intervene, before said photochemical pre-polymerisation or upon the completion thereof (before pouring the pre-polymerised mixture into the mould).

Thus, according to another variant of the implementation of step a of the method of the invention, the pre-polymerisation is a photochemical pre-polymerisation carried out on the mixture of monomers containing the effective amount of photoinitiator(s) or advantageously containing only 40% to 60% of said effective amount expressed by weight, the remainder of photoinitiator(s) being then added to said mixture of monomers, upon the completion of its photochemical pre-polymerisation, before it is poured into the mould ; the effective amount of thermal catalyst(s) being added to said mixture of monomers before its photochemical pre-polymerisation, or upon the completion thereof.

The following is further specified with reference to said pre-polymerisation step of the method of the invention (step a). It has been seen that in general it is a matter of a thermal or photochemical pre-polymerisation. It is not totally excluded to implement the pre-polymerisation under the joint action of heat and a suitable irradiation, i.e. to carry out a thermal pre-polymerisation and a photochemical pre-polymerisation, the catalyst(s) and photoinitiator(s) thus acting together within the mixture of monomers . . . .

The pre-polymerised mixture according to step a described above is then just poured into a mould.

Its polymerisation is finalised in said mould, and characteristically, this is in two successive steps:

a photogelification until its gel point, and a final or supplementary thermal polymerisation.

The photoinitiator(s) intervening for the implementation of the mixed method of the invention, which thus combines photochemical polymerisation (step c and optionally step a) and thermal polymerisation (step d and optionally step a) in three steps (a, b, c), intervenes, in any case, in a limited amount—equal to or less than 0.009 parts by weight per 100 parts by weight of monomers—and it cannot thus reveal to be detrimental, especially regarding the problem of yellowing.

Furthermore, the intervention of said photoinitiator(s) is optimised by implementing the photogelification and the pre-polymerisation, if it is a case of a photochemical pre-polymerisation, under a radiation which is predominantly in the visible, i.e. almost free from ultraviolet radiation. In fact, conventional UV lamps are not suited or badly suited. It is strongly suggested to use them in making use of UV filters. It is however recommended to implement the photogelification step of the method of the invention and the step of pre-polymerisation, if it is a case of a photochemical pre-polymerisation, with fluorescent tubes as source of radiation which are predominantly in the visible (having their maximum power beyond 400 nm, e.g. at 410 nm or 460 nm). This type of radiation penetrates into the thickness of the irradiated material and hardly interferes with photochromic colorants which are optionally present.

The person skilled in the art will now have gleaned all the interest of the mixed method of the invention (which includes thermal and photochemical polymerisation), which comprises three main steps (pre-polymerisation/ photochromic gelification/thermal polymerisation) and whose implementation enables obtaining thin and thick pieces (especially lenses), which are free from any defect in appearance and constraint, especially insofar as the polymerisation is implemented in the mould (especially the lens mould), rapidly with a diffusion of oxygen which is reduced to a minimum.

The method of the invention is also interesting in that it is suitable for the polymerisation of mixtures of monomers of different types ((meth)acrylic, vinylic monomers . . . ) and especially of mixed type ((meth)acrylic and vinylic monomers). The mixture of monomers to be polymerised according to the invention may in fact contain acrylic and/or methacrylic and/or alkenyl monomers, especially vinylic or allylic monomers.

Advantageously, said mixture mainly contains difunctional monomers of type (a) and difunctional monomers of type (b), as defined below. Compositions based on these two types of different monomers were described by the Applicant in the FR 97 05 458 patent application, filed on the May $2^{nd}$ 1997, published as FR-A-2,762,845. Their use for preparing organic pieces of optical quality, and especially organic lenses by way of the method of the invention has revealed to be particularly advantageous. Said compositions were developed by the Applicant within the context of research for a compromise between the optical properties, even photochromic properties and the mechanical properties of a plastic material which can be used especially in ophthalmology, and obtained by (thermal) radical co-polymerisation of monomers. Characteristically, said compositions include at least one short chain (meth)acrylic difunctional monomer and at least one long chain alkenic difunctional monomer. The resin resulting from their polymerisation thus possesses a nanophasic structure which provides it with the properties sought after. Said short chain (meth)acrylic difunctional monomer(s) (of type (a) and of formula (A), (A'): see further on) do in fact bring about the rigidity, this rigidity being modulated by the presence of said long chain alkenic difunctional monomer(s) (of type (b) and of formula (B), (B'), (B"): see further on), which, surprisingly, also enable providing said composition with excellent photochromic properties. Thus, the difference in functionality of said monomers of type (a) and (b) advantageously slow down the gelification of the resulting polymerisable composition. This characteristic enables the resin obtained from said composition to give good optical properties and especially in the case wherein photochromic colorants are incorporated within it, to express rapidly and, at best, the photochromic properties.

Thus, the method of the invention is therefore particularly advantageously implemented with a mixture of monomers which contains at least one difunctional monomer of type (a) and at least one difunctional monomer of type (b):

the difunctional monomer(s) of type (a)—(meth)acrylic— being of one or the other of the formulae (A) and (A') below:

formula (A):

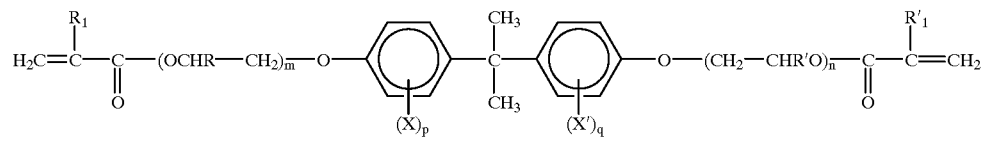

in which:
$R_1$, $R'_1$, R and R', identical or different, are independently a hydrogen or a methyl group;

m and n are, independently, integers between 0 and 4 (inclusive); and are advantageously independently equal to 1 or 2;

X and X', identical or different, are a halogen and preferably represent a chlorine and/or a bromine atom;

p and q are, independently, integers between 0 and 4 (inclusive);

formula (A'):

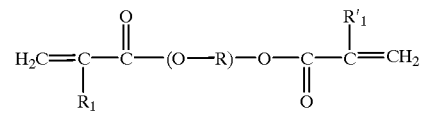

in which:
$R_1$ and $R'_1$, identical or different, are independently a hydrogen or a methyl group;

R is a straight or branched alkyl radical having 2 to 8 carbon atoms, a cycloalkyl radical having 3 to 6 carbon atoms, an ether radical of formula (R'— O—R") in which R' and R", identical or different, are independently a straight or branched alkyl radical having 2 to 4 carbon atoms;

the difunctional monomer(s) of type (b)—long chain alkenic difunctional oligomer—being of one or the other of the formulae (B), (B') and (B") below:

formula (B):

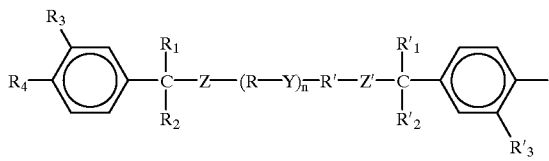

in which:
- $R_1$, $R'_1$, $R_2$ and $R'_2$, identical or different, are independently hydrogen or a straight or branched alkyl radical, advantageously straight, having 1 to 4 carbon atoms; and particularly advantageously correspond to a methyl group;
- $R_3$ and $R_4$, different, are independently one hydrogen and the other an alkenyl radical having 2 to 6 carbon atoms, advantageously 2 to 4 carbon atoms and particularly advantageously an isopropenyl radical;
- $R'_3$ and $R'_4$, different, are independently one hydrogen and the other an alkenyl radical having 2 to 6 carbon atoms, advantageously 2 to 4 carbon atoms and particularly advantageously an isopropenyl radical; (advantageously, the two ends of the molecule are identical; i.e: $R_3=R'_3$ and $R_4=R'_4$);
- Z represents a carbamate function (—NH—CO—O—), a thiocarbamate function (—NH—CO—S—) or a urea function (—NH—CO—NH—);
- Z', independent from Z and advantageously respectively with respect to Z, represents a carbamate function (—O—CO—NH—), a thiocarbamate function (—S—CO—NH—) or a urea function (—NH—CO—NH—);
- R' represents a straight or branched alkyl radical having 2 to 4 carbon atoms;
- R, identical or different when $n \geq 2$, is a straight or branched alkyl radical having 2 to 4 carbon atoms;
- Y, identical or different when $n \geq 2$, is oxygen or sulphur;
- n is an integer defined such that the total number of carbon atoms, contained in the long chain situated between the two moieties Z and Z', be at least equal to 18 and advantageously be between 18 and 112 (inclusive);

formula (B'):

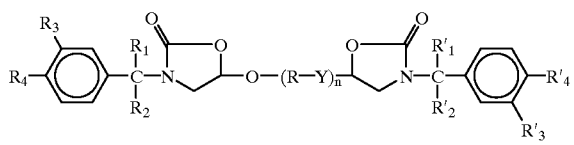

in which:
- $R_1$, $R_2$, $R_3$, $R_4$, $R'_1$, $R'_2$, $R'_3$, $R'_4$, R and Y are as defined above with reference to formula (B);
- n is an integer defined such that the total number of carbon atoms, contained in the long chain of moiety $(R-Y)_n$, be at least equal to 22 and advantageously be between 22 and 104 (inclusive);

formula (B"):

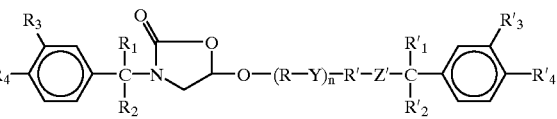

in which:
- $R_1$, $R_2$, $R_3$, $R_4$, $R'_1$, $R'_2$, $R'_3$, $R'_4$, R, R' and Y are as defined above with reference to formula (B);
- Z' is a carbamate function (—O—CO—NH—) or Z' is a thiocarbamate function (—S—CO—NH—); advantageously, Z' is a carbamate function;
- n is an integer defined such that the total number of carbon atoms, contained in the long chain of moiety $(R-Y)_n$—R', be at least equal to 22 and advantageously be between 22 and 104 (inclusive).

Furthermore, said mixture of monomers of type (a) and (b) can further contain:

(c) at least one aromatic monovinylic monomer of formula (C):

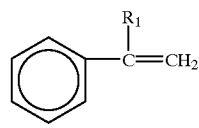

in which $R_1$=H or $CH_3$; said monovinylic monomer advantageously consisting of styrene;
and/or (d) at least one aromatic divinylic monomer of formula (D):

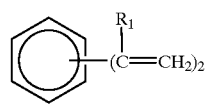

in which $R_1$=H or $CH_3$; said divinylic monomer advantageously consisting of divinylbenzene;
and/or (e) at least one (meth)acrylic monomer of formula (E)

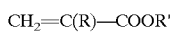

$$CH_2=C(R)-COOR'$$

in which R=H or $CH_3$ and R' is a straight or branched alkyl radical having 4 to 16 carbon atoms, an optionally substituted benzyl or phenoxyethyl radical (generally substituted by a $C_1$-$C_6$ alkyl group) or a polyethoxy group of formula —$(CH_2$—$CH_2$—$O)_n$R" in which n is an integer between 1 and 10 and R"=$CH_3$ or $C_2H_5$;
said (meth)acrylic monomer advantageously consisting of 2-ethylhexyl-methacrylate;
and/or (f) diallylphthalate.

The compounds listed above ((c) to (f)) advantageously intervene with the difunctional monomers of type (a) and (b). Advantageously, they may intervene within any mixture of monomers to be polymerised according to the method of the invention.

It is now proposed to specify somewhat the nature and the amount of each of the components which intervene or which may intervene in the mixture which is polymerisable according to the method of the invention.

The monomers of type (a) may or may not all be of the same formula (A) or (A') . . . Thus the mixtures to be polymerised according to the invention advantageously comprise:

either monomers of a same formula (A) (at least one);
or monomers of a same formula (A') (at least one);
or mixtures (non mixed) of monomers of different formulae (A);
or mixtures (non mixed) of monomers of different formulae (A');
or mixtures (mixed) of monomers of formula(e) (A) and of formula(e) (A').

According to a preferred variant of the invention, one or more symmetrical monomers of type (a) are used. Said monomers of type (a), of formula (A) or (A') in which the $R_1$ and $R'_1$ groups are identical, the same as R and R' groups, as well as the X and X' substituents for the compounds of formula (A), are qualified as symmetrical.

Said symmetrical monomers of type (a) of formula (A) are known and are available commercially or are easily accessible to the person skilled in the art. It may be noted that said monomers which do not have a halogen on the aromatic rings do in fact correspond to the first monomers of formula (I) in the sense of the WO-A-92/05209 document. Said monomers of type (a) of formula (A) having halogen(s) on the aromatic ring(s) will be easily obtained by the person skilled in the art by using derivatives which are appropriately substituted on said aromatic ring(s). Within the context of the invention, the monomers of formula (A), in which R and R', identical, are hydrogen or a methyl group, $R_1$ and $R'_1$ are a methyl group, m and n are independently equal to 1 or 2, and p=q=0, are preferred. A particularly advantageous variant corresponds to the monomer of formula (A) of the above type with, in addition, R=R'=H and m=n=2. Said monomer is notably marketed by Akzo Nobel (NL) under the commercial designation DIACRYL 121. The synthesis of the dissymmetrical monomers of formula (A) are of no particular problem to the person skilled in the art.

The monomers (a) of formula (A') are also well-known and result from the conventional reaction of an aliphatic diol or a short-chain alkyleneglycol (with a maximum of 8 carbon atoms in said chain) with at least one type of (meth)acrylic derivative depending on whether it is desired to obtain monomers of formula (A') which are symmetrical or dissymmetrical at their ends.

These monomers of type (a) generally intervene in the mixture to be polymerised at a rate of 40 to 99 parts by weight for 100 parts by weight of the mixture of monomers of type (a) and (b). If they intervene in a smaller amount, the polymerisable composition has a tendency to retract during its polymerisation inducing a premature turn-out which, in turn, is responsible for a deterioration of the optical properties of the final resin.

The monomers (b) of formula (B), (B') and (B") are long-chain difunctional alkenic monomers. Said monomers have or have not a more or less pronounced symmetry ($R_1/R'_1$, $R_2/R'_2$, $R_3/R'_3$, $R_4/R'_4$, Z/Z').

These monomers of type (b) may or may not all have the same formula (B), (B') or (B") . . . Thus, the mixtures to be polymerised according to the invention advantageously comprise:

either monomers of a same formula (B) (at least one);
or monomers of a same formula (B') (at least one);
or monomers of a same formula (B") (at least one);
or mixtures (non mixed) of monomers of different formulae (B);
or mixtures (non mixed) of monomers of different formulae (B');
or mixtures (non mixed) of monomers of different formulae (B");
or mixtures (mixed, binary or ternary) of monomers selected from the monomers of formula(e) (B), of formula(e) (B') and of formula(e) (B").

The monomers of type (b) which are long-chain alkenic difunctional oligomers, said chain being a polyoxyalkylene or polymercaptoalkylene chain, even a mixed chain, are obtained according to the conventional conditions of organic synthesis by the reaction:

between one or several derivatives having a functionality of the alkenylisocyanate type, of formula I and/or II:

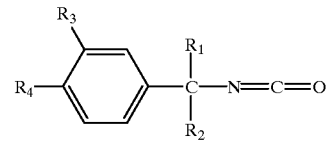

formula I and/or

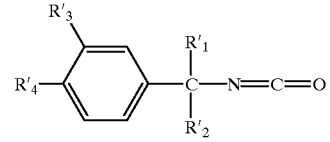

formula II in which $R_1$, $R_2$, $R_3$, $R_4$, $R'_1$, $R'_2$, $R'_3$ and $R'_4$ are such as defined above. According to a preferred variant of the invention, the monomers of type (b) used are symmetrical at their ends. In order to do this, a single type of alkenylisocyanate derivative (thus formulae I and II are identical) is used. In a particularly advantageous way, a vinylisocyanate derivative is used in which $R_1=R_2=CH_3$ (or $R'_1=R'_2=CH_3$), $R_3$ (or $R'_3$) is an isopropenyl radical and $R_4$ (or $R'_4$) is hydrogen, thus corresponding to 3-isopropenyl-α,α-dimethylbenzyl-isocyanate (of general designation m-TMI®). The oligomers (b) obtained from said derivatives are preferred;

and a compound which intrinsically has a long chain, said compound being:
either a compound which is symmetrical about its terminal functions and which corresponds:
to a diol of formula HO—(R—Y)$_n$—R'—OH;
or to a dithiol of formula HS—(R—Y)$_n$—R'—SH;
or to a diamine of formula $H_2N$—(R—Y)$_n$—R'—$NH_2$; which allows obtaining said intrinsically symmetrical oligomers of formula (B) (intrinsically symmetrical means monomers of formula (B) in which the Z and Z' groups are functions of identical nature);
or to a biepoxy of formula

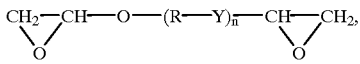

the reaction thus leading to the synthesis of said oligomers of formula (B');
or a compound which is dissymmetrical about its terminal functions:
  it being possible for said functions to be an alcohol, thiol or amine function; all combinations being possible: these compounds enabling obtaining other intrinsically dissymmetric difunctional oligomers of formula (B) (intrinsically dissymmetrical means monomers of formula (B) in which the Z and Z' groups are functions of different nature);
said functions respectively being an epoxy function and an alcohol function or an epoxy function and a thiol function, the compounds then being of formula

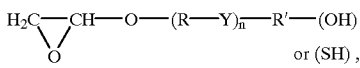

the reaction thus leading to the synthesis of said oligomers of formula (B").

In every case, R, R',Y and n are such as defined above; preferentially, Y is oxygen (the long chain then being a polyoxyalkylene chain).

The molecular mass of the long polyoxyalkylene and/or polymercaptoalkylene chain which correspond to the $(R-Y)_n-R'$ or $(R-Y)_n$ radical in said formulae (B, B', B") specified above, is generally at least equal to 500 g.mol$^{-1}$ and lower than 2000 g.mol$^{-1}$; and preferentially, said molecular mass is between 600 g.mol$^{-1}$ and 900 g.mol$^{-1}$.

($\alpha$) —Z and Z' are carbamate functions of formula (—NH—CO—O—) and (—O—CO—NH—) respectively;
  n is an integer defined in such a way that the total number of carbon atoms contained in the long chain situated between the two motifs Z and Z', is between 18 and 112; and advantageously, in the case of a polyoxyalkylene chain, is between 24 and 112 and particularly advantageously between 26 and 50 in the case of a polyoxyalkylene of molecular mass between 600 and 900 g.mol$^{-1}$;
or ($\beta$) —Z and Z' are thiocarbamate functions of formula (—NH—CO—S—) and (—S—CO—NH—) respectively
  n is an integer defined in such a way that the total number of carbon atoms contained in the long chain situated between the two motifs Z and Z', is between 18 and 108; and advantageously, in the case of a polyoxyalkylene chain, is between 24 and 108 and particularly advantageously between 28 and 46 in the case of a polyoxyalkylene chain of molecular mass between 600 and 900 g.mol$^{-1}$;
or ($\gamma$) —Z and Z' are urea functions (—NH—CO—NH—)
  n is an integer defined in such a way that the total number of carbon atoms contained in the long chain situated between the two motifs Z and Z', is between 18 and 112; and advantageously, in the case of a polyoxyalkylene chain, is between 24 and 112, and particularly advantageously between 28 and 50 in the case of a polyoxyalkylene of molecular mass between 600 and 900 g.mol$^{-1}$.

The person skilled in the art will have understood that formula (B), in the case ($\alpha$) above wherein the number of carbon atoms contained in the long chain is equal to 50, may for example be written:

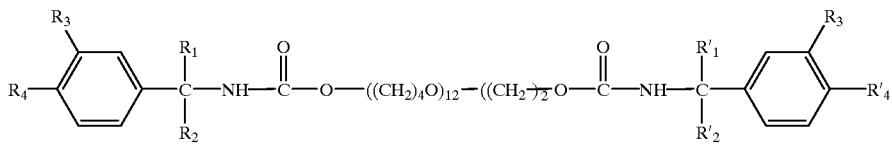

In a particularly advantageous way, one or several intrinsically symmetrical monomers of type (b) of formula (B) (as defined above) are brought to intervene:

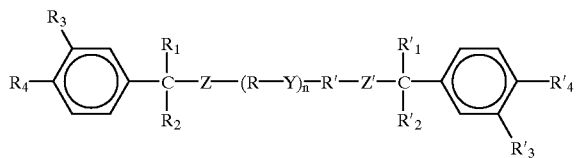

in which R, R', $R_1$, $R_2$, $R_3$, $R_4$, $R'_1$, $R'_2$, $R'_3$, $R'_4$ are such as defined above (and advantageously so that the two ends of the molecule are identical; i.e.: $R_1=R'_1$, $R_2=R'_2$, $R_3=R'_3$ and $R_4=R'_4$, with even more advantageously $R_1=R'_1=R_2=R'_2=CH_3$ and $R_3=R'_3$ and $R_4=R'_4$ with one of $R_3$ and $R_4$ being hydrogen and the other being an isopropenyl group) and Y is such as defined above and advantageously consists of an oxygen (X=O) and:

In the same way, the person skilled in the art will have understood that generally the minimal values mentioned above which define the number of carbon atoms in the long chain of motif $(R-Y)_n-R'$ or $(R-Y)_n$, correspond to compounds having a polymercaptoalkylene chain (Y=S).

In a particularly advantageous manner, said monomer(s) of type (b) have a general formula (B) such as defined above in which:
  $R_1$, $R_2$, $R'_1$ and $R'_2$, identical, are methyl radicals; $R_3$ and $R'_3$ are an isopropenyl radical; $R_4$ and $R'_4$ are hydrogen and
  either Z and Z' are urea functions (—NH—CO—NH—) and
  R' represents an ethylene or propylene group;
  n is an integer equal to 13 or 19 which defines a total number of carbon atoms between Z and Z' equal to 28 or 40 when $(R-Y)_n$ is a polyoxyethylene chain; or n is an integer equal to 10 or 14 which defines a total number of carbon atoms between Z and Z' equal to 33 or 45 when $(R-Y)_n$ is a polyoxypropylene chain; or n is an integer between the lower limit values (10 to 13) and upper limit values (14 to 19) such as defined above, when $(R-Y)_n$ is a polyoxyethylene/polyoxypropylene mixed chain; which thus defines the monomers of type (b) of designation RUDI JEF 600 and RUDI JEF 900 (see the Examples in FR 97 05458), respectively when n has one of the lower limit values (n between 10 and 13 inclusive) and n has one of the upper limit values (n between 14 and 19 inclusive);

or Z and Z' are carbamate functions of formulae (—NH—CO—O—) and (—O—CO—NH—) respectively, and R' represents an ethylene group;

$(R-Y)_n$ represents a long polyoxyethylene chain;

n is an integer equal to 13 or 19 which defines the total number of carbon atoms contained in the long chain situated between the two motifs Z and Z' equal to 28 or 40; which thus define the monomers of type (b) of designation RUDI 600 and RUDI 900 (see the Examples of FR 97 05458), when n=13 and n=19 respectively.

It is more particularly preferred to implement the original method of the invention with monomers of type (b) above (of general formula (B) above in which Z and Z' are urea functions) in a mixture with monomers of type (a) as specified above.

The monomers of type (b) generally intervene in the mixture to be polymerised at a rate of 1 to 60 parts by weight for 100 parts by weight of the mixture of monomers of type (a) and (b).

The mixtures to be polymerised according to the invention may further contain, as already indicated, other monomers in combination or not with monomers of type (a) and (b) specified above. For 100 parts by weight of the mixture of monomers of type (a) and (b), said mixtures can contain from 1 to 60 parts by weight (advantageously from 10 to 50 parts by weight) of at least one monomer selected from the alkenic monomers (such as those of formulae (C) and (D) and diallylphthalate (f)), advantageously vinylic and allylic monomers, (meth)acrylic monomers (such as those of formula (E)) and mixtures thereof. In light of the effects sought-after, when these types of monomer are added, the person skilled in the art will know how to determine and optimise the intervening amounts of each type of said monomer (in any case, the total amount of said monomer(s) which intervene in the composition to be polymerised is between 1 to 60 parts by weight of the mixture of monomers of type (a) and (b)).

The vinylic monomers of formula (C)—styrene and/or methylstyrene—intervene in combination with the monomer (s) of type (a) in order to loosen the network. The intervention at this stage of styrene may be particularly advantageous insofar as this polymerised compound has a rather high refractive index (n=1.595). Said styrene constitutes the particularly preferred compound of this class of monomer.

The compound of formula (D) consists of divinylberzene (DVB) or di(methylvinyl)benzene. Divinylbenzene is the particularly preferred compound of formula (D). The intervention of at least one compound of formula (D) may reveal to be advantageous in that notably said compound moderates, in a general manner, the effects of the compound (s) of formula (C). The beneficial action of such a compound of formula (D) has been notably demonstrated on the expression of photochromic properties. With reference to divinylbenzene, insofar as this polymerised compound has a relatively high refractive index (n=1.61), its intervention is also beneficial in that it leads to an increase in the refractive index of the polymers of the invention.

The mixture to be polymerised according to the method of the invention also contains advantageously at least one compound of formula (E). It is a (meth)acrylic monomer such as defined above. It may also be butyl, pentyl, hexyl, heptyl, octyl or 2-ethylhexyl(meth)acrylate or even ethyltriglycol(meth)acrylate. 2-Ethylhexylmethacrylate (EHMA) is the preferred compound of formula (E). The presence of this type of compound has revealed to be advantageous for the turning-out of the polymerised material and for the implementation of finishing treatments of the latter.

Finally, the polymerisable composition may contain diallylphthalate which notably allows adjusting the index and/or other optical and mechanical properties.

As specified above, the intervention of the compounds of formula (C) and/or (D) and/or (E) and/or diallylphthalate is not obligatory. It does however reveal to be advantageous.

Similarly, it may reveal to be extremely advantageous to intervene at least one acrylic monomer into the mixture of monomers to be polymerised according to the original method of the invention, said acrylic monomer being at least trifunctional (i.e. possessing at least three reactive functions: three double bonds, advantageously possessing three to six reactive functions). Said monomer intervenes as a constituent monomer of the final matrix but above all as an accelerator of the pre-polymerisation (step a) and of the photogelification (step c).

It is advantageously selected from:
pentaerythritol triacrylate,
pentaerythritol tetraacrylate,
propoxylated glycerol triacrylate,
trimethylolpropane triacrylate,
polyurethane triacrylate,
dipentaerythritol hexaacrylate,
and advantageously consists of pentaerythritol triacrylate.

Its intervention, in substitution, at least partial, of a difunctional acrylic monomer or in addition to a mixture of acrylic and/or methacrylic and/or alkenyl monomers, improves the kinetics of polymerisation, without introducing any defect in the final product.

Generally, the accelerators of polymerisation, said at least trifunctional acrylic monomers, are made to intervene at the rate of 2 to 10%, advantageously 4 to 6%, by weight, of the total weight of the mixture of monomers to be polymerised according to the invention.

After having specified the nature of the monomers which may constitute main constituent elements of the piece prepared by the method of the invention, we now come to the additives to be incorporated in the mixture of monomers in order on the one hand to enable the polymerisation according to the invention of it, and on the other hand, in order to give photochromic properties to the prepared piece, if this is desired.

The mixture of monomers to be polymerised according to the original method of the invention can therefore contain an effective amount of at least one photochromic colorant, in order to give photochromic properties to the pieces prepared.

Said colorant is advantageously selected from the spiroxazines and the chromenes (or a combination thereof) which are endowed with photochromic properties. A large number of photochromic colorants of this type are described in the literature and are commercially available.

Spiroxazine colorants which may be used within the context of the present invention have notably been described in the patents U.S. Pat. Nos. 3,562,172, 4,634,767, 4,637, 968, 4,720,547, 4,756,973, 4,785,097, 4,792,224, 4,816,584, 4,831,142, 4,909,963, 4,931,219, 4,936,995, 4,986,934, 5,114,621, 5,139,707, 5,233,038, 4,215,010, 4,342,668, 4,699,473, 4,851,530, 4,913,544, 5,171,636, 5,180,524, 5,166,345, in the patent applications EP-A-0 508 219, 0 232 295 and 0 171 909 and in the application FR-A-2 738 248 (of the Applicant).

The use of 1,3-dihydro-3,3-dimethyl-1-neopentyl-6'-(4"-N,N-diethyl-amino)-spiro-[2H]-indole-2,3'-3H-naphtho[2,1-b][1,4]oxazine, and the use of the spiroxazines described in the application FR-A-2 738 248, are most particularly recommended within the context of the present invention.

Chromene colorants which are usable within the context of the present invention are notably described in patents U.S. Pat. Nos. 3,567,605, 4,889,413, 4,931,221, 5,200,116, 5,066,818, 5,224,602, 5,238,981, 5,106,998, 4,980,089, 5,130,058, and the application EP-A-0 562 915. Said chromenes may notably consist of naphthopyrans.

The use of 2,2-bis-(4'-methoxyphenyl)-5,6-dimethyl-[2H]-naphtho[1,2-b]pyran, is most particularly recommended within the context of the present invention.

Spiropyran colorants which are also usable within the context of the present invention are notably described in the following texts:

.PHOTOCHROMISM G. Brown, Editor—Techniques of Chemistry—Wiley Interscience—Vol. III—1971—Chapter III—Pages 45–294—R. C. Bertelson.

.PHOTOCHROMISM—Molecules & Systems—Edited by H. Dürr—H. Bouas-Laurent—Elsevier 1990—Chapter 8: Spiropyrans—Pages 314–455—R. Gugliemetti.

The teachings in all these documents are incorporated herein by reference.

The intervention of other photochromic colorants such as fulgides are not excluded within the context of the present invention.

The intervention of spiroxazines and/or chromenes is largely preferred within the context of the present invention.

It has been indicated that the mixtures to be polymerised according to the invention which are intended for generating a photochromic piece, especially a lens, contain an effective amount of at least one photochromic colorant. It is in fact frequent, within the context of the present invention, to make a combination of photochromic colorants intervene, with the aim of obtaining a specific tint in the darkened state. Within the context of particularly preferred embodiments of the invention, the intervening photochromic filler comprises a combination of chromenes. A particularly preferred combination is that of chromenes below: 2-(p-dimethylaminophenyl)-2-(p-methoxyphenyl)-5-methyl-7,9-dimethoxy-[2H]-naphtho-[1,2-b]pyran and 3-(p-methoxyphenyl)-3-phenyl-6-morpholino-[3H]-naphtho-[2,1-b]pyran. This combination allows obtaining an interesting grey colour.

By way of reference and in no way limiting, it is herein indicated that said photochromic colorants generally intervene in the mixtures to be polymerised (and those which have been polymerised) of the invention at a rate of 0.01 to 1% by weight, advantageously at a rate of 0.05 to 0.5% by weight with respect to the total weight of monomers.

Said colorants may themselves also very well contain a polymerisable and/or cross-linkable reactive group in their chemical formula as well. They intervene themselves then as co-monomers in the mixture to be polymerised; and they are chemically bound i.e. grafted to the matrix of said polymerised composition. Generally, the pieces of the invention contain their photochromic colorant(s) free or bound to their matrix.

The mixture of monomers to be polymerised according to the invention also contain, before the implementation of step a and/or only before the implementation of step c (see above), the effective amounts of thermal catalyst(s) and photoinitiator(s).

A sole additive of the thermal catalyst type and a sole additive of the photoinitiator type may generally intervene.

The thermal catalyst is generally used at the rate of 0.01 to 1% by weight, preferably from 0.05 to 0.5% by weight, of the weight of the monomers present. The thermal catalyst must obviously be "inert" towards photochromic colorant(s) optionally present. The thermal catalyst is optionally selected from the diazo compounds. These compounds are familiar to the person skilled in the art and are commercially available. Examples of such diazo compounds are azobisisobutyronitrile (AIBN), 2,2'-azobis(2-methylbutyronitrile) (AMBN), and 2,2'-azobis(2,4-dimethylvaleonitrile) (ADVN). It is more particularly recommended to implement the method of the invention in the presence of the latter diazo compound: ADVN.

In the absence of such a thermal catalyst or in the presence of too low an amount of it, it would become necessary to carry out the thermal pre-polymerisation and final thermal polymerisation at higher temperatures and this would render the reaction difficult to control . . . In the presence of too great an amount of catalyst, an excess of free radicals may be generated, this excess of free radicals inducing a destruction of the photochromic colorant(s) optionally present, and an accelerated fatigue of the final material. In this latter hypothesis, the pre-polymerisation and polymerisation may also accelerate and become difficult to control.

The person skilled in the art has even to appreciate in the light of the above indications, and especially of the nature of the monomers present, the effective amounts to intervene in each case. A polymerisation modifier may advantageously intervene, in a manner known per se, in combination with said thermal catalyst.

The polymerisation modifier generally intervenes at a maximum content of 5% by weight, advantageously at the rate of 0.01 to 2% by weight, of the weight of the monomers to be co-polymerised. It is noted here that it is possible to do away with the presence of such a polymerisation modifier in the hypothesis in which the piece is prepared under a reduced thickness (e<2.0 mm). In this hypothesis, the problems of the evacuation of heat are not come up against . . . For the preparation of a resin of the invention having a thickness greater than 2.0 mm, the presence of a polymerisation modifier in the amounts indicated above is generally opportune. It is highly advised against going over the maximal content of 5% indicated above since the glass transition temperature of the material prepared becomes too low. It is highly recommended for the preparation of a piece of thickness between 1.5 and 20 mm, a polymerisation modifier content of about 1.2%. It has been noted that the colorability and the darkening kinetics of the photochromic pieces (especially lenses) prepared according to the invention increase with the amount of polymerisation modifier which intervenes. In the same way, when this amount goes up, the mechanical resistance increases and the optical qualities improves . . . .

It is obviously appropriate that said polymerisation modifier should not destroy the photochromic colorant(s) optionally present during the polymerisation and/or should not induce a discoloration of the material on its own. Said polymerisation modifier is advantageously a chain transfer agent. Said chain transfer agent can be a non-halogenated chain transfer agent such as a linear alkane thiol or bis-mercapto-ethyl ether. Dodecanethiol may be cited as an example of a linear alkane thiol without being limiting. It is not excluded to use other types of chain transfer agents such as alkane thiols substituted with at least one aryl or alkyl radical or thiophenols. All these compounds are familiar to the person skilled in the art and are commercially available.

It has been seen previously that whatever the implementation variant of the method of the invention, the photoinitiator(s) intervene(s) characteristically in a limited amount: less than or equal to 0.009 parts by weight per 100 parts by weight of the mixture of monomers to be polymerised. It or they advantageously intervene(s) in an amount between 0.002 and 0.009 parts by weight. Below this, the photochromic polymerisation (to be implemented in step c, even in step a) can only be difficult to implement. Above this, and the problems of the photochemical polymerisation techniques of the prior art are come up against.

One sole photoinitiator generally intervenes. It may especially be selected from acyl oxides and diacylphosphine oxides. It advantageously consists of a diacylphosphine oxide.

It is incidentally noted that the irradiation time for the optional implementation of the photochemical pre-polymerisation and that of the photogelification obviously depend upon the wavelength and the intensity of the irradiation, and upon the shape and the thickness of the mixture to be polymerised, upon the amount of photoinitiator present . . . and that said irradiation time is generally selected after experimental tests. Said irradiation is implemented for the photogelification through the surface of at least one of the walls of the mould.

It is not excluded from the context of the present invention to also intervene, in adequate amounts, other additives for the implementation of the photochemical polymerisation (step c, and optionally step a).

The method of the invention, as described above under its method and materials aspects on which it is possible to be carried out, is more particularly suited for the preparation of organic pieces of optical quality, and especially lenses, the thickness of which is between 0.2 and 20 mm. As indicted in the introduction of the present text, the field of application of the method of the invention is not limited, with reference to lenses, to the elaboration of thin lenses (the thickness of which is for example limited to 2 mm). In this, the method of the invention is particularly interesting.

It has been seen above that the mixture of monomers to be polymerised according to the method of the invention advantageously comprises at least one acrylic monomer which is at least trifunctional.

The use of this type of monomers for the preparation of organic pieces of optical quality and especially organic lenses is totally innovative. Thus, such organic pieces, obtained by radical polymerisation of a mixture of monomers containing at least one such monomer which is at least trifunctional, are novel and constitute another object of the present invention. Said organic pieces, novel per se, are advantageously prepared according to the method described above, which constitutes the first object of the present invention. It is not excluded to obtain them by a method of polymerisation of the prior art which is purely thermal or purely photochemical.

According to its last object, the present invention relates to original polymerisable compositions which are able to constitute the starting product, on which the method of the invention is advantageously implemented, in order to obtain organic pieces of optical quality and especially organic lenses. Said compositions are, as specified already, mixtures of radically polymerisable monomers. Said mixtures optionally contain at least one photochromic colorant. They may be of the type of the compositions according to U.S. Pat. No. 5,621,017 but characteristically, they contain at most 0.009 parts by weight (advantageously 0.002 to 0.009 parts by weight), per 100 parts by weight of monomers, of at least one photoinitiator. Characteristically, they may also contain at least one thermal catalyst for the subsequent implementation of the pre-polymerisation step, when it is a case of a thermal pre-polymerisation and of the (thermal) final polymerisation, in the hypothesis in which they are used for the implementation of the method of the invention.

They are advantageously of the type of the compositions according to FR-A-2,762,845 and characteristically they contain at least one acrylic monomer having at least three reactive functions (advantageously three to six reactive functions). Such compositions—mixtures of radically polymerisable monomers, presently claimed per se—comprise:

at least one difunctional monomer, of type (a), of one or the other of the formulae (A) and (A') as defined above;
at least one difunctional monomer, of type (b), of one or the other of the formulae (B), (B') and (B") as defined above; and
at least one acrylic monomer having at least three reactive functions, advantageously selected from the group consisting in:
pentaerythritol triacrylate,
pentaerythritol tetraacrylate,
propoxylated glycerol triacrylate,
trimethylolpropane triacrylate,
polyurethane triacrylate,
dipentaerythritol hexaacrylate.

Such compositions are able to further contain at least one monomer selected from the group consisting in:
the monomers of type (c), of formula (C) (see above);
the monomers of type (d), of formula (D) (see above);

the monomers of type (e), of formula (E) (see above);
the diallylphthalate (see above).
They advantageously contain:
at least one difunctional monomer, of type (a), or formula (A), as defined above;
at least one difunctional monomer, of type (b), of formula (B), as defined above;
at least one acrylic monomer having at least three reactive functions, advantageously selected from the group consisting in:
pentaerythritol triacrylate,
pentaerythritol tetraacrylate,
propoxylated glycerol triacrylate,
trimethylolpropane triacrylate,
polyurethane triacrylate,
dipentaerythritol hexaacrylate;
at least one aromatic divinylic monomer of formula (D):

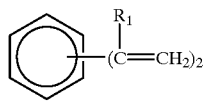

in which $R_1$=H or $CH_3$; said divinylic monomer advantageously consisting of divinylbenzene; and
at least one (meth)acrylic monomer of formula (E):

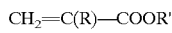

in which R=H or $CH_3$ and R' is a straight or branched alkyl radical having 4 to 16 carbon atoms, an optionally substituted benzyl or phenoxyethyl radical or a polyethoxy group of formula —$(CH_2—CH_2—O)_n$R" in which n is an integer between 1 and 10 and R"=$CH_3$ or $C_2H_5$; said (meth)acrylic monomer advantageously consisting of 2-ethylhexylmethacrylate.

The invention, under its different aspects, is illustrated by Examples 1, 1bis, 1ter to 4 below. Its interest reverts to the consideration of said Examples and the Comparative Examples 1 and 2.

Mixtures of monomers (novel per se, by virtue of the fact that they contain a low amount of photoinitiator) are polymerised according to the invention (thermal polymerisation+photochemical polymerisation) in order to obtain organic lenses (novel per se, when they intervene at least one acrylic monomer which is at least trifunctional, in the starting mixture).

Preparation of the urea-ended difunctional oligomer of type (b)

In a thermostated glass reactor equipped with a thermometer, a stirrer, a nitrogen purge and a dropping funnel, the following are introduced with stirring:
300 g of JEFFAMINE® ED 2003 (poly(oxyethylene) diamine of average molecular mass 2,000) from Huntsman Corp., and
0.075 g of methoxyphenol.
When the JEFFAMINE has melted (homogeneous mixture),
700 g of JEFFAMINE® ED600 (poly(oxyethylene) diamine of average molecular mass 613) de Hunstman Corp. are added.
The temperature of the mixture is brought to 30° C., and 764 g of benzyl methacrylate are then added. The mixture is cooled to 20° C., and 528 g of 3-isopropenyl-α,α-dimethylbenzylisocyanate (m-TMI® from Cytec) are then added slowly with vigorous stirring. The urea-ended difunctional oligomer of type (b) is thus obtained which is ready to be diluted with the other monomers and other additives which can intervene in a polymerisable composition to be polymerised according to the invention.

The product obtained in solution in benzyl methacrylate is designated by the abbreviation JEFF/BzMA.

Abbreviations of the compounds:
Diacryl 121: tetraethoxylated bisphenol A dimethacrylate : difunctional monomer of type (a)
BzMA: benzyl methacrylate
DVB: divinylbenzene
EHMA: ethylhexylmethacrylate
PETA: pentaerythritol triacrylate
NDM: n-dodecyl mercaptan (n-dodecanthiol)
JEFF/BzMA: cf. synthesis described above: difunctional oligomer of type (b)
IRGACURE 819 from CIBA: bis(2,4,6-trimethylbenzoyl)-phenylphosphineoxide
ADVN: 2,2'-azobis(2,4-dimethylpentanitrile)
CR49: 2-(p-dimethylaminophenyl)-2-(p-methoxyphenyl)-5-methyl-7,9-dimethoxy-[2H]naphtho[1,2b]pyran,
CR59: 3-(p-methoxyphenyl)-3-phenyl-6-morpholino-3H-naphtho-[2,-b]pyran,
Ruby Red: 3-phenyl-3-(4'-piperidinophenyl)-6-morpholino-3H-naphtho [2,1b]pyran.

EXAMPLE 1

α) Preparation of the mixture to be polymerised.

A 1 l thermostated glass reactor equipped with a stirrer, a thermometer and a nitrogen purge, is loaded with:
92 g of DVB, to which 0.456 g of CR49, 0.0536 g of CR59 as photochromic compounds, 2.08 g of ADVN as thermal initiator of radical polymerisation, 0.072 g of IRGACURE 819 as photo initiator of radical polymerisation, are added.

The mixture thus obtained is maintained with stirring up to the total dissolution of the compounds at 25° C.

345.6 g of monomer of reference JEFF/BzMA, 338.4 g of Diacryl 121, 23.2 g of EHMA, 40 g of PETA and 4 g of NDM, are then added.

The mixture is maintained with stirring and under nitrogen purge for about 30 minutes at ambient temperature.

β) Thermal pre-polymerisation.

The temperature is then maintained at 46° C. until a partially polymerised syrupy mixture is obtained which has a viscosity of 0.4 Pa.s. (about 35 min).

At this stage, the reaction is stopped by cooling the reaction mixture to 20° C. and bubbling dry air in for 15 minutes.

The mixture (the resin) thus obtained is then pumped out in vacuo and maintained with stirring for about 2 hours.

γ) Photogelification.

This resin is then poured into a lens mould constituted of a mould and a glass counter-mould having a curved edge of about 87 mm and a PVC joint of thickness 11 mm.

The assemblies thus prepared are then exposed to the light of fluorescent tubes (Brillant 840 from Mazda, E=0.30 mW/cm² to 460 nm) until the resin gelifies, i.e. about 15 to 30 min.

δ) Thermal polymerisation.

The assemblies are then placed in an oven and are subjected to the following cycle:

rise from 25 to 50° C. in 5 h and then from 50 to 95° C. in 3 h and finally a plateau at 95° C. of 2 h.

After sufficient cooling, the samples are turned out of their moulds and inspected visually.

The samples prepared following this method of the invention possess no visible optical defect, such as striations, cords, fissuring . . . .

EXAMPLES 1 bis and 1 ter

α) Preparation of the mixtures to be polymerised.

A 1 l thermostated glass reactor equipped with a stirrer, a thermometer and a nitrogen purge is loaded with:

| for Example 1bis | for Example 1ter |
|---|---|
| 338.4 g of JEFF/BzMA | 338.4 g of JEFF/BzMA |
| 331.2 g of Diacryl 121 | 331.2 g of Diacryl 121 |
| 90.4 g of DVB | 90.4 g of DVB |
| 39.2 g of PETA | 39.2 g of PETA |
| 0.456 g of CR49 | 0.352 g of CR49 |
| 0.0536 g of CR59 | 0.12 g of CR59 |
| 4 g of NDM | 0.0832 g of RubyRed |
| 0.072 g of Irgacure 819 | 4 g of NDM |
| 2.08 g of ADVN | 0.072 g of Irgacure 819 |
|  | 2.08 g of ADVN |

The mixture thus obtained is maintained with stirring up to the total dissolution of the compounds at 25° C.

The said mixture is then maintained with stirring and under nitrogen purge for about 30 minutes at ambient temperature.

β) Thermal pre-polymerisation.

γ) Photogelification.

δ) Thermal polymerisation.

These successive operations are identical to those described previously in Example 1. The samples prepared following this method of the invention (grey samples for example 1bis, brown samples for example 1ter) possess no visible optical defect.

EXAMPLE 2

The operations are identical to those described previously in Example 1, except for step (β) of partial thermal polymerisation at 46° C. (pre-polymerisation) which in this case is replaced by a partial photopolymerisation step (β')

In order to do this, the glass reactor is subjected to a luminous flux originating from fluorescent tubes which are identical to those described in the preeceding Example [E=0.30 mW/cm²].

The partially polymerised syrupy mixture having a viscosity of 0.4 Pa.s. is obtained after an exposure time of about 50 minutes at ambient temperature.

The operations that follow are identical as that described in Example 1.

The lenses obtained after turn-out are free from defects.

EXAMPLE 3

Carried out in the same way as that described in Example 2 except that the photoinitiator IRGACURE 819 is introduced in two lots as follows: 0.032 g of IRGACURE 819 only are loaded into the reactor in order to enable the partial photopolymerisation of the mixture as indicated in Example 2.

The remainder, i.e. 0.040 g of IRGACURE 819 is added to the partially polymerised syrupy mixture (upon completion of step β')

The lenses obtained by following this method are free from optical defects.

EXAMPLE 4

The operations are identical to those described in Example 3, except that the thermal polymerisation initiator, ADVN, is introduced after the partial photopolymerisation of the mixture, at the same time as the remainder of IRGACURE 819.

As previously, the lenses possess a very good optical quality.

COMPARATIVE EXAMPLE 1

Carried out as in Example 1, but in omitting the gelification step (step γ) under fluorescent tube (logically, in step α, no IRGACURE 819 intervenes). The thermally partially polymerised mixture having a viscosity of 0.4 Pa.s. is therefore poured directly into the moulds and then subjected to the curing cycle in an oven described in Example 1.

The lenses possess numerous striations and cords, which renders them unsuitable for a use such as for ophthalmic lenses.

COMPARATIVE EXAMPLE 2

Carried out as in Example 1, but by omitting the partial polymerisation step (thermal pre-polymerisation step β) of the mixture.

Thus, the composition is poured directly into the moulds and is exposed to the luminous flux originating from the same fluorescent tubes as those used for the preceding Examples in order to ensure the gelification of the mixture.

The gelification time is then about 1 hour 30 minutes, and the lenses obtained have numerous defects (striations, cords).

What is claimed is:

1. A method of preparing photochromic or non-photochromic organic articles of optical quality by radical polymerisation of a mixture of radically polymerisable monomers, wherein said method comprises:

a) adjusting, by pre-polymerisation, the viscosity of said mixture to a value between 0.4 and 2 Pa.s;

b) pouring said pre-polymerised mixture into a mould;

c) photogelifying, in said mould, said pre-polymerised mixture until its gel point;

d) completing the polymerisation of said pre-polymerised and gelified mixture in said mould by heat treatment;

wherein the method further comprises adding an effective amount of at least one thermal catalyst and of at least one photoinitiator in said mixture of monomers for the implementation of said pre-polymerisation, photogelification, and polymerisation; wherein said photoinitiator(s) are present in an amount less than or equal to 0.009 parts by weight per 100 parts by weight of said mixture of monomers;

and wherein said mixture of monomers comprises one or more difunctional monomers having formula (A) or formula (A') and one or more difunctional monomers having formula (B), (B'), or (B"), wherein formula (A) is

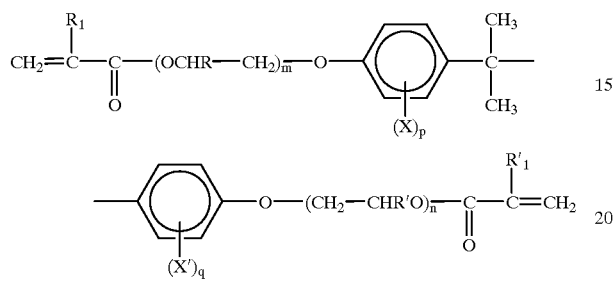

in which:
R$_1$, R'$_1$, R, and R', identical or different, are independently a hydrogen or a methyl group;
m and n are, independently, integers between 0 and 4, inclusive;
X and X', identical or different, are a halogen; and
p and g are, independently, integers between 0 and 4, inclusive;

wherein formula (A') is

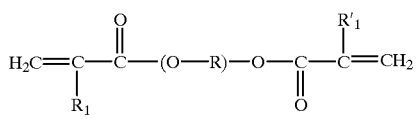

in which:
R$_1$, and R'$_1$, identical or different, are independently a hydrogen or a methyl group; and
R is a straight or branched alkyl radical having 2 to 8 carbon atoms, a cycloalkyl radical having 3 to 6 carbon atoms, or an ether radical of formula (R'—O—R") in which R' and R", identical or different, are independently a straight or branched alkyl radical having 2 to 4 carbon atoms;

wherein formula (B) is

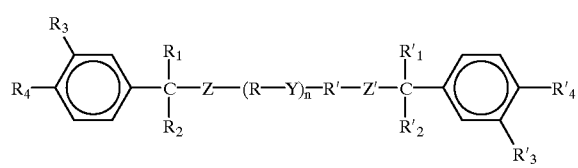

in which:
R$_1$, R'$_1$, R$_2$, and R'$_2$, identical or different, are independently hydrogen or a straight or branched alkyl radical;
R$_3$ and R$_4$, different, are independently one hydrogen and the other an alkenyl radical having 2 to 6 carbon atoms;
R'$_3$ and R'$_4$, different, are independently one hydrogen and the other an alkenyl radical having 2 to 6 carbon atoms;

Z represents a carbamate function (—NH—CO—O—), a thiocarbamate function (—NH—CO—S—), or a urea function (—NH—CO—NH—);
Z', independent from Z, represents a carbamate function (—O—CO—NH—), a thiocarbamate function (—S—CO—NH—), or a urea function (—NH—CO—NH—);
R' represents a straight or branched alkyl radical having 2 to 4 carbon atoms;
R, identical or different when n≧2, is a straight or branched alkyl radical having 2 to 4 carbon atoms;
Y, identical or different when n≧2, is oxygen or sulphur; and
n is an integer defined such that the total number of carbon atoms contained in the long chain situated between the two moieties Z and Z' is at least equal to 18;

wherein formula (B') is

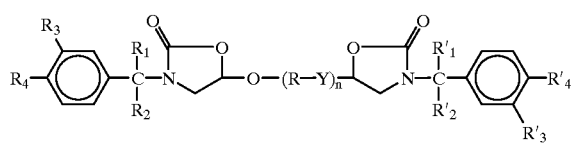

in which:
R$_1$, R$_2$, R$_3$, R$_4$, R'$_1$, R'$_2$, R'$_3$, R'$_4$, R, and Y are as defined above with reference to formula (B); and
n is an integer defined such that the total number of carbon atoms contained in the long chain of moiety (R—Y)$_n$ is at least equal to 22; and wherein formula (B") is

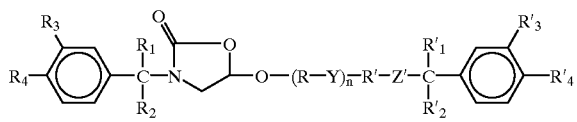

in which:
R$_1$, R$_2$, R$_3$, R$_4$, R'$_1$, R'$_2$, R'$_3$, R'$_4$, R, R', and Y are as defined above with reference to formula (B);
Z' is a carbamate function (—O—CO—NH—), or Z' is a thiocarbamate function (—S—CO—NH—); and
n is an integer defined such that the total number of carbon atoms contained in the long chain of moiety (R—Y)$_n$R' is at least equal to 22.

2. The method according to claim 1, wherein said pre-polymerisation is a thermal pre-polymerisation or a photochemical pre-polymerisation or a combination thereof.

3. The method according to claim 1, wherein said pre-polymerisation is a thermal pre-polymerisation; wherein the thermal pre-polymerisation is carried out on the mixture of monomers containing the effective amounts of thermal catalyst(s) and photoinitiator(s); or wherein the thermal pre-polymerisation is carried out on the mixture of monomers containing only the effective amount of thermal catalyst(s), the effective amount of photoinitiator(s) being then added to said mixture of monomers upon completion of the thermal pre-polymerisation and before the pre-polymerised mixture is poured into the mould.

4. The method according to claim 1, wherein said pre-polymerisation is a photochemical pre-polymerisation; wherein said photochemical pre-polymerisation is carried out on the mixture of monomers containing an amount of photoinitiator(s) effective to carry out said photochemical pre-polymerisation; and wherein the effective amount of thermal catalyst(s) is added to said mixture of monomers before its photochemical pre-polymerisation or upon completion thereof.

5. The method according to claim 4, wherein the amount of photoinitiator present during said photochemical pre-polymerisation is from 40% to 60% of said effective amount expressed by weight; and wherein the remainder of photoinitiator(s) is added to said mixture of monomers upon completion of the photochemical pre-polymerisation and before it is poured into the mould.

6. The method according to claim 1, wherein said photogelification is carried out using radiation which is predominantly visible radiation and which is substantially free from ultraviolet radiation.

7. The method according to claim 6, wherein said pre-polymerisation is a photochemical pre-polymerisation and wherein said photochemical pre-polymerisation is carried out using radiation which is predominantly visible radiation and which is substantially free from ultraviolet radiation.

8. The method according to claim 1, wherein said mixture of monomers comprises acrylic and/or methacrylic and/or alkenyl monomers.

9. The method according to claim 1, wherein said mixture of monomers comprises at least one monomer having formula (B) in which:

Z and Z' are urea functions (—NH—CO—NH—);

$R_1$, $R'_1$, $R_2$, and $R'_2$ are identical and represent a methyl group;

$R_3$ and $R'_3$, identical, represent an isopropenyl group;

$R_4$ and $R'_4$, identical, are hydrogen;

R' represents an ethylene or propylene group; and n is an integer equal to 13 or 19 which defines a total umber of carbon atoms, between Z and Z', equal to 28 or 40 when $(R-Y)_n$ is a polyoxyethylene chain; or n is an integer equal to 10 or 14 which defines a total number of carbon atoms, between Z and Z', equal to 33 or 45 when $(R-Y)_n$ is a polyoxy propylene chain; or n is an integer between the lower limit values (n is between 10 and 13 (inclusive)) and upper limit values (n is between 14 and 19 (inclusive)), when $(R-Y)_n$ is a polyoxyethylene/polyoxypropylene mixed chain.

10. The method according to claim 1, wherein said mixture of monomers further comprises:

at least one aromatic monovinylic monomer of formula (C):

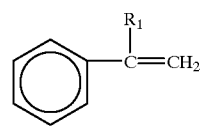

in which $R_1$=H or $CH_3$; and/or at least one aromatic divinylic monomer of formula (D):

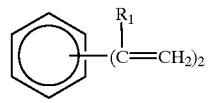

in which $R_1$=H or $CH_3$; and/or at least one (meth)acrylic monomer of formula (E):

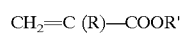

in which R=H or $CH_3$ and R' is a straight or branched alkyl radical having 4 to 16 carbon atoms, an optionally substituted benzyl or phenoxyethyl radical, or a polyethoxy group of formula $—(CH_2—CH_2—O)_nR''$ in which n is an integer between 1 and 10 and R''=$CH_3$ or $C_2H_5$; and/or diallylphthalate.

11. The method according to claim 10, wherein said at least one monovinylic monomer is styrene, wherein said at least one divinylic monomer is divinylbenzene, and wherein said at least one (meth)acrylic monomer is 2-ethylhexylmethacrylate.

12. The method according to claim 1, wherein said mixture of monomers comprises at least one acrylic monomer having at least three acrylate functional groups.

13. The method according to claim 12, wherein said at least one acrylic monomer having at least three acrylate functional groups is selected from the group consisting of pentaerythritol triacrylate, pentaerythritol tetraacrylate, propoxylated glycerol triacrylate, trimethylolpropane triacrylate, polyurethane triacrylate, and dipentaerythritol hexaacrylate.

14. The method according to claim 1. wherein said mixture of monomers comprises an amount of at least one photochromic colorant effective to give photochromic properties to the organic pieces.

15. The method according to claim 1, wherein said at least one thermal catalyst is a diazo compound.

16. The method according to claim 1, wherein said at least one photoinitiator is a diacylphosphine oxide.

17. The method according to claim 1, wherein the photochromic or non-photochromic organic article have a thickness between 0.2 and 20 mm.

18. The method according to claim 1, wherein said photochromic or non-photochromic organic articles are photochromic or non-photochromic organic lenses.

19. Organic articles of optical quality prepared by the method according to claim 1.

20. Organic articles of optical quality prepared by the method according to claim 12.

21. Lenses prepared by the method according to claim 1.

22. Lenses prepared by the method according to claim 12.

23. Mixtures of radically polymerisable monomers, optionally comprising an effective amount of at least one photochromic colorant, wherein said mixtures comprise:

at least one difunctional monomer having formulae (A) or formula (A') as defined in claim 1;

at least one difunctional monomer having formula (B), formula (B'), or formula (B") as defined in claim 1; and at least one acrylic monomer having at least three acrylate functional groups.

24. Mixtures of radically polymerisable monomer according to claim 23, wherein said at least one acrylic monomer having at least three acrylate functional groups is selected from the group consisting of pentaerythritol triacrylate, pentaerythritol tetraacrylate, propoxylated glycerol triacrylate, trimethylolpropane triacrylate, polyurethane triacrylate, and dipentaerythritol hexaacrylate.

25. Mixtures of radically polymerisable monomers according to claim 23, wherein said mixtures comprise:

at least one difunctional monomer having formula (A), as defined in claim 1;

at least one difunctional monomer having formula (B), as defined in claim 1;

at least one acrylic monomer having at least three acrylate functional groups;

at least one aromatic divinylic monomer of formula (D):

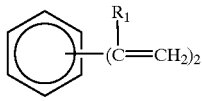

in which $R_1$=H or $CH_3$; and at least one (meth)acrylic monomer of formula (E):

$CH_2=C(R)—COOR'$ in which R=H or $CH_3$ and R' is a straight or branched alkyl radical having 4 to 16 carbon atoms, an optionally substituted benzyl or phenoxyethyl radical, or a polyethoxy group of formula —$(CH_2—CH_2—O)_n R"$ in which n is an integer between 1 and 10 and R"=$CH_3$ or $C_2H_5$.

26. Mixtures of radically polymerisable monomer according to claim 25, wherein said at least one acrylic monomer having at least three acrylate functional groups is selected from the group consisting of pentaerythritol triacrylate, pentaerythritol tetraacrylate, propoxylated glycerol triacrylate, trimethylolpropane triacrylate, polyurethane triacrylate, and dipentaerythritol hexaacrylate and wherein said at least one (meth)acrylic monomer is 2-ethylhexylmethacrylate.

* * * * *